US008902518B2

(12) United States Patent
Pan

(10) Patent No.: US 8,902,518 B2
(45) Date of Patent: Dec. 2, 2014

(54) OPTICAL DEVICE FOR CAMERA TESTING

(71) Applicant: National Chiao Tung University, Hsinchu (TW)

(72) Inventor: Jui-Wen Pan, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 38 days.

(21) Appl. No.: 13/762,565

(22) Filed: Feb. 8, 2013

(65) Prior Publication Data
US 2014/0049844 A1 Feb. 20, 2014

(30) Foreign Application Priority Data

Aug. 16, 2012 (TW) .............................. 101129726 A

(51) Int. Cl.
G02B 9/34 (2006.01)
G02B 13/24 (2006.01)
G02B 15/10 (2006.01)

(52) U.S. Cl.
CPC *G02B 9/34* (2013.01); *G02B 13/24* (2013.01); *G02B 15/10* (2013.01)
USPC .......................................... 359/771; 359/780

(58) Field of Classification Search
CPC .............. G02B 9/34; G02B 9/60; G02B 9/62; G02B 9/64; G02C 11/02; G02C 11/04
USPC .................................. 359/749, 753, 783, 780
See application file for complete search history.

(56) References Cited

U.S. PATENT DOCUMENTS 6,417,975 B1 * 7/2002 Isono ............................. 359/783
6,825,993 B2 * 11/2004 Noda ............................. 359/749
7,538,813 B2 * 5/2009 Wernersson ................... 348/345
2009/0213474 A1 * 8/2009 Wang et al. .................... 359/771

OTHER PUBLICATIONS

Jui-Wen Pan, "Compact camera module testing equipment with a conversion lens," Optics Express, vol. 20, No. 5, Feb. 27, 2012.

* cited by examiner

*Primary Examiner* — Darryl J Collins
(74) *Attorney, Agent, or Firm* — Occhiuti & Rohlicek LLP

(57) ABSTRACT

An optical device is to be disposed between a test screen and a test camera that captures an image on the test screen through the optical device. The optical device includes first, second, third and fourth lenses arranged from a camera side to a screen side in the given order. The first lens has a shape factor ranging from −10 to 5, the second lens is a positive lens and has a shape factor ranging from −15 to 2, the third lens is a positive lens and has a shape factor ranging from −30 to 1, and the fourth lens is a positive lens and has a shape factor ranging from −30 to 1. A ratio of a focal length of the optical device to that of the test camera ranges from 1 to 80.

11 Claims, 5 Drawing Sheets

OPTICAL DEVICE FOR CAMERA TESTING

CROSS-REFERENCE TO RELATED APPLICATION

This application claims priority to Taiwanese Application No. 101129726, filed on Aug. 16, 2012.

BACKGROUND OF THE INVENTION

1. Field of the Invention

The invention relates to an optical device, and more particularly to an optical device for camera testing.

2. Description of the Related Art

Referring to FIG. 1, when a test camera 1 is tested in a conventional manner, a test screen 2 is used for image capturing by the a test camera 1, and a distance d between the lens of the test camera 1 and the test screen 2 is adjusted based on definition of the images captured by the test camera 1, so as to determine a back focal length, which leads to an image captured by the test camera 1 to have highest definition with the distance d. However, this method needs a large amount of space to satisfy the required distance d, and operation thereof is inconvenient to conduct.

SUMMARY OF THE INVENTION

Therefore, an object of the present invention is to provide an optical device adapted for reducing a required screen distance during camera testing.

According to the present invention, an optical device is adapted to be disposed between a test screen and a test camera that captures an image on the test screen through the optical device. The optical device comprises first, second, third, and fourth lenses arranged from a camera side to a screen side in the given order.

The first lens has a shape factor ranging from −10 to 5, the second lens is a positive lens and has a shape factor ranging from −15 to 2, the third lens is a positive lens and has a shape factor ranging from −30 to 1, and the fourth lens is a positive lens and has a shape factor ranging from −30 to 1.

A ratio of a focal length of the optical device to that of the test camera ranges from 1 to 80.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
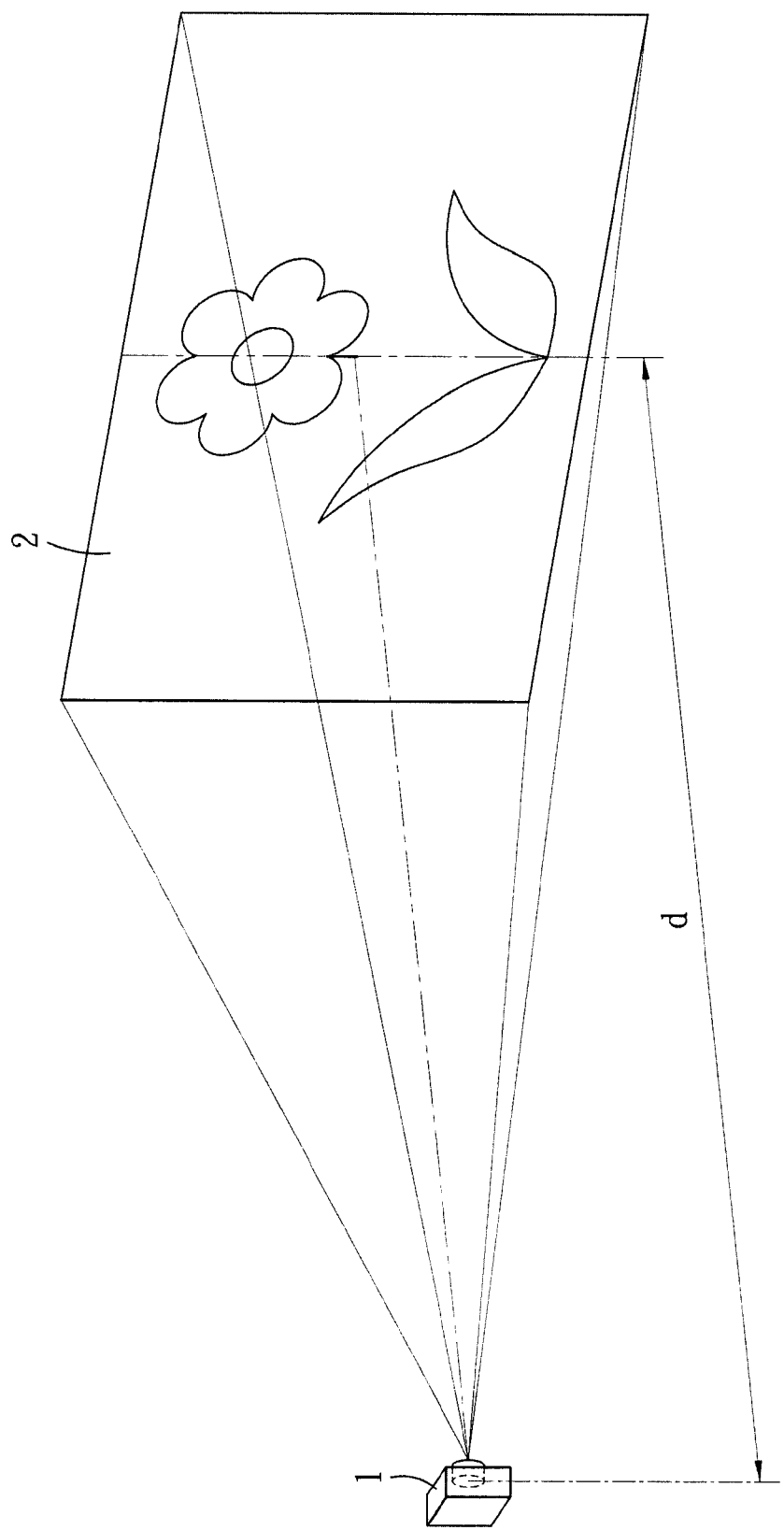
FIG. 1 is a perspective view showing how a test camera is tested in a conventional manner.
Figure 2:
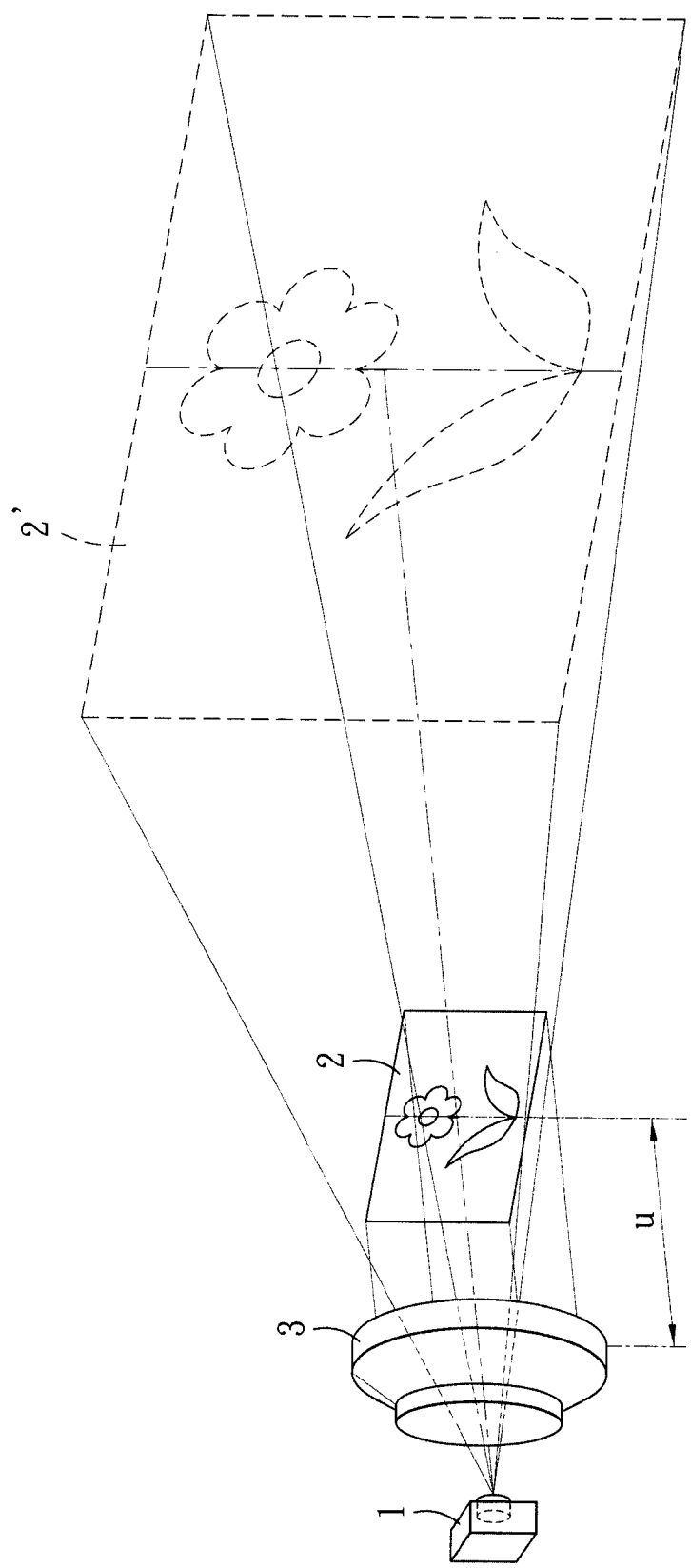
FIG. 2 is a perspective view showing a how a test camera is tested using an optical device according to the present invention.
Figure 3:
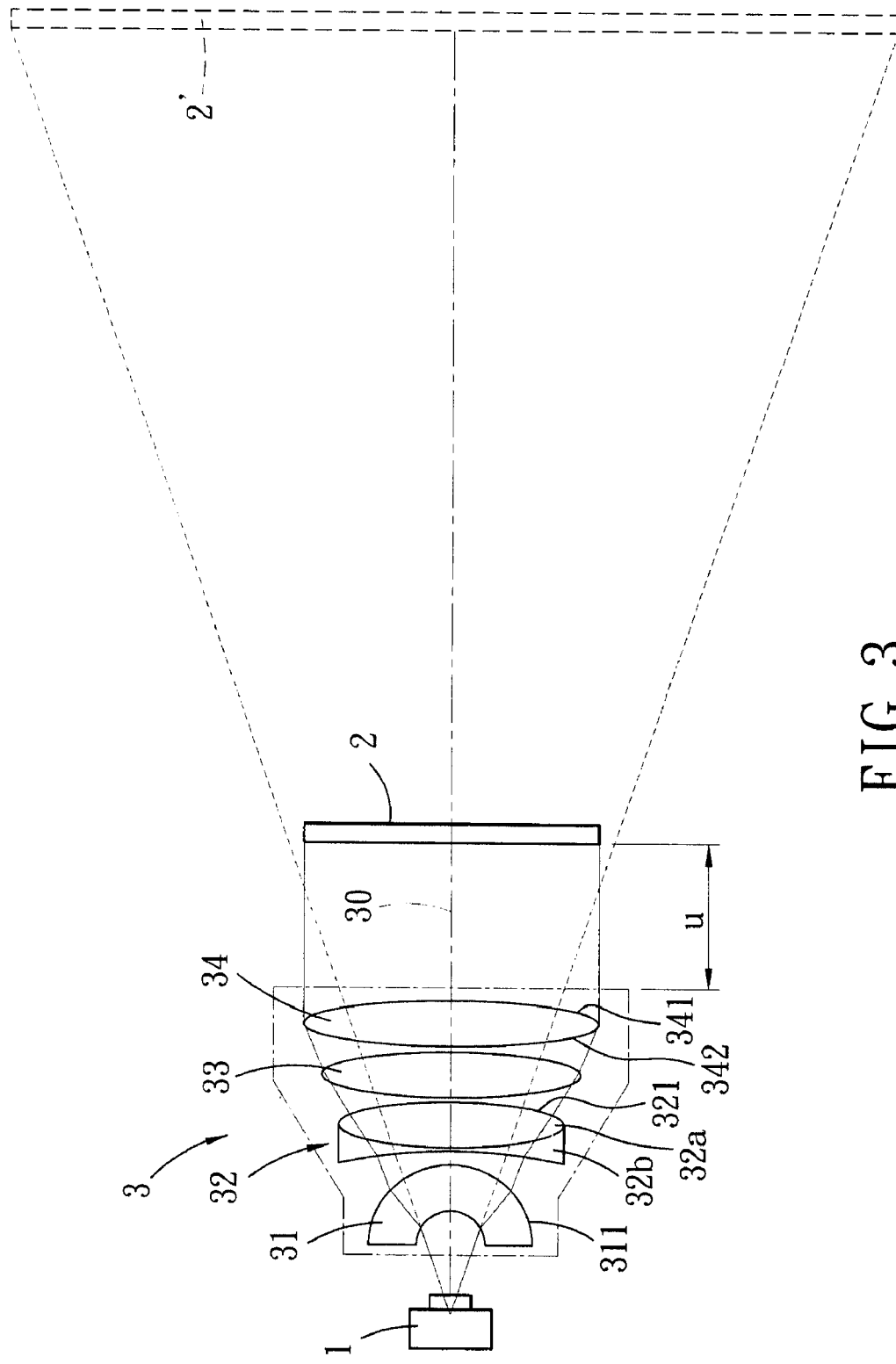
FIG. 3 is a schematic diagram illustrating a preferred embodiment of the optical device for camera testing according to the present invention.

Referring to FIG. 2 and FIG. 3, a preferred embodiment of the optical device 3 according to the present invention is shown to be disposed between a test screen 2 and a test camera 1 that captures an image on the test screen 2 through the optical device 3. By use of the optical device 3 of this invention, the image captured by the test camera 1 from the test screen 2 is similar to one directly captured from a virtual screen 2' that is larger than the test screen 2 and that is farther from the test camera 1 compared to the test screen 2. The optical device 3 includes first, second, third and fourth lenses 31, 32, 33, 34 arranged from a camera side to a screen side in the given order. Each of the first, second, third and fourth lenses 31, 32, 33, 34 has a first lens surface facing toward the screen side and a second lens surface facing toward the camera side. In this embodiment, each of the first, second, third and fourth lenses 31, 32, 33, 34 is made of glass.

Throughout the disclosure, a lens shape of each lens is defined using a shape factor $X=(C_1+C_2)/(C_1-C_2)$, where $C_1$ is a curvature of the first lens surface and $C_2$ is a curvature of the second lens surface. As an example, the fourth lens 34 has a first lens surface 341 with a curvature $C_{41}$ and a second lens surface 342 with a curvature $C_{42}$, so that the shape factor of the fourth lens 34 is $(C_{41}+C_{42})/(C_{41}-C_{42})$.

Figure 4:
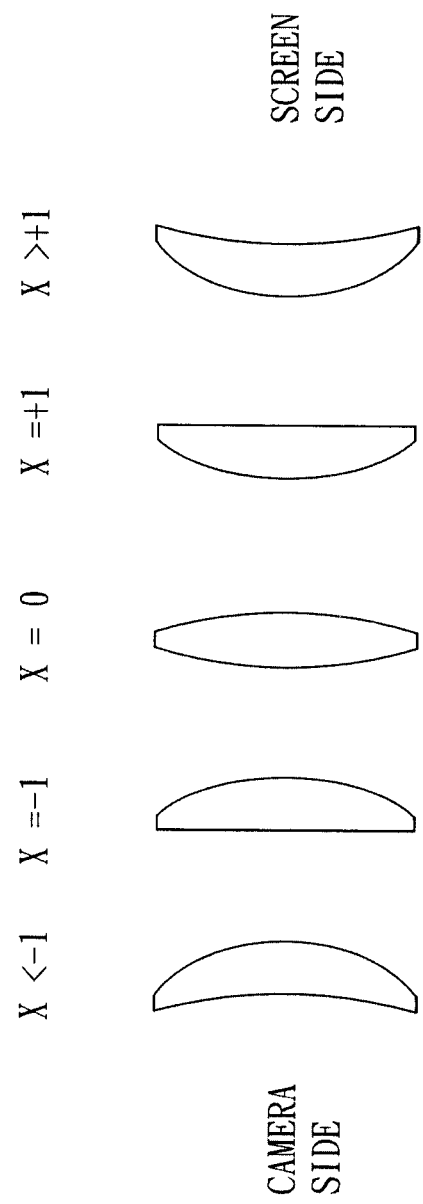
FIG. 4 is a schematic diagram illustrating relationships between shape factors and lens shapes.

Referring to FIG. 4, different types of lenses correspond to different ranges of the shape factor X. For example, the shape factor X of a biconvex lens ranges between −1 and 1, and the shape factor X of a meniscus lens may be greater than 1 or smaller than −1 depending on a direction toward which the convex surface faces.

Figure 5:
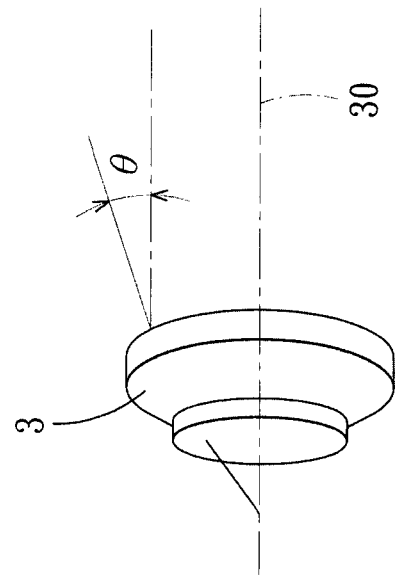
FIG. 5 is a schematic diagram illustrating an aplanatic condition.

Referring to FIG. 3 and FIG. 5, the first lens 31 is a negative lens and has a shape factor preferably ranging from 1 to 5. In this preferred embodiment, the first lens 31 is a meniscus negative lens having a convex first lens surface 311 and substantially conforms with an aplanatic condition. An included angle α of the chief ray and the normal vector $N_1$ of the first lens surface 311 of the first lens 31 is not greater than 7 degrees.

The second lens 32 is a positive lens and has a shape factor preferably ranging from −15 to −1. In this preferred embodiment, the second lens 32 is an achromatic meniscus positive lens having a convex first lens surface 321. The second lens 32 is a doublet lens composed of a convex lens 32a and a concave lens 32b which have different refractive indexes, and substantially conforms with the aplanatic condition. An included angle β of the chief ray and the normal vector $N_2$ of the first lens surface 321 of the second lens 32 is not greater than 7 degrees.

The third lens 33 is a positive lens and has a shape factor preferably ranging from −1 to 1. In this preferred embodiment, the third lens 33 is a biconvex lens.

The fourth lens 34 is a positive lens and has a shape factor preferably ranging from −1 to 1. In this preferred embodiment, the fourth lens 34 is a biconvex lens.

Figure 6:
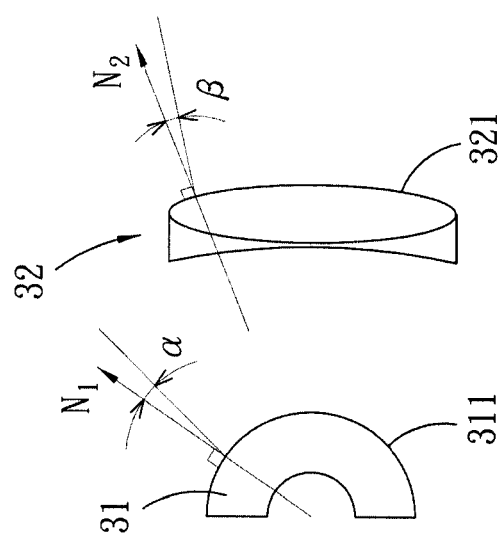
FIG. 6 is a schematic diagram illustrating a telecentric system.

Referring to FIG. 3 and FIG. 6, the first, second, third and fourth lenses 31, 32, 33, 34 are arranged to form a near telecentric system. Light from the test screen 2 passes through the fourth, third, second and first lenses 34, 33, 32, 31 in sequence and enter the lens of the test camera 1, so that the image captured by the test camera 1 from the test screen 2 through the optical device 3 is similar to one directly captured from the virtual screen 2' and enlarged from the test screen 2. An included angle θ of the chief ray from the test screen 2 to the optical device 3 and a plane parallel to an optical axis 30 of the optical device 3 is not greater than 5 degrees.

The test camera 1 may capture images of the virtual screen 2' through the optical device 3 with different object distances u between the optical device 3 and the test screen 2, so that the test screen 2 used during conventional camera testing may be replaced using the virtual screen 2' generated from the smaller test screen 2 for reducing a required screen distance during camera testing according to this invention. For example, during the conventional camera testing, the test screen 2 is placed to be spaced apart from the test camera 1 by 5000 mm. Through use of the optical device 3 of this invention, a smaller test screen 2 may be placed to be spaced apart from the test camera 1 by only 38.32 mm to generate the virtual screen 2' having a same size as compared to the test screen 2 used in the conventional camera testing. With the smaller test screen 2 and shorter required screen distance, the volume of the test machine for camera testing may be reduced to be 8.3% of the conventional test machine at an object distance of 2000 mm.

In addition, a ratio of a focal length f of the optical device 3 to that of the test camera 1 is preferred to range from 1 to 80, a field of view of the optical device 3 is preferred to be smaller than 80 degrees, and an aperture of the optical device 3 is preferred to range between f/4 and f/50 (i.e., f-number ranges between 4 and 50). Under these conditions, the optical distortion may be reduced to be smaller than 3%. Detailed information of the optical device 3 is listed in Table 1. In the preferred embodiment, the first, second, third and fourth lenses 31, 32, 33, 34 are a meniscus negative lens, a meniscus positive lens, a biconvex lens, and a biconvex lens, respectively.

TABLE 1

| Surface | | Radius of Curvature | Thickness | Refractive Index ($N_d$) | Abbe Number ($V_d$) |
|---|---|---|---|---|---|
| Camera Aperture | | | 32.726 | | |
| 2 | First Lens | −25.02 | 22 | 1.600510 | 64.323649 |
| 3 | | −41.10 | 1 | | |
| 4 | Second Lens | −120.23 | 8 | 1.650610 | 62.723649 |
| 5 | | 200 | 14 | 1.52 | 64.184 |
| 6 | | −74.32 | 1 | | |
| 7 | Third Lens | 780.46 | 18 | 1.610410 | 61.53649 |
| 8 | | −275.01 | 1 | | |
| 9 | Fourth Lens | 304.76 | 22 | 1.630410 | 58.323649 |
| 10 | | −560.85 | 129.51 | | |
| Screen | | | | | |

The optical device 3 of the present invention is packaged to have F-theta structure, which refers to a single unit packed with multiple lenses, resulting in a smaller volume and constant optical characteristics. Moreover, the second lens 32 may be composed of more than two lenses having different refractive indices, or may be made by filling between two lenses a liquid having a different refractive index for achieving the achromatic effect.

It should be noted that the preferred embodiment may be implemented in other ways. In other implementations, at least one of the first and second lenses 31, 32 is required to conform with the aplanatic condition, and any one of the first, second, third and fourth lenses 31, 32, 33, 34 may be the achromatic lens.

When the first lens 31 is a negative lens, the convex surface thereof may be disposed to face toward the camera side. Moreover, in other embodiments, the first lens 31 may be a positive lens with a shape factor ranging from −10 to 5, and is not limited to be a biconvex lens, a meniscus positive lens, or a plano-convex lens. In other embodiments, the second lens 32 may be a positive lens with a shape factor ranging from −15 to 2, and is not limited to be a biconvex lens, a meniscus positive lens, or a plano-convex lens.

In other embodiments, each of the third and fourth lenses 33, 34 may be a positive lens with a shape factor ranging from −30 to 1, and is not limited to be a biconvex lens, a meniscus positive lens, or a plano-convex lens.

To sum up, the optical device 3 of the present invention has a relatively small volume, and leads to a shorter object distance for camera testing. The size of the captured image of the virtual screen 2' hardly changes during adjustment of the distance u between the test screen 2 and the optical device 3. Moreover, optical distortion is minimized with the design of the optical device 3. Therefore, the conventional test screen may be replaced using the optical device 3 of the present invention and a smaller test screen.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical device to be disposed between a test screen and a test camera that captures an image on the test screen through said optical device, said optical device comprising first, second, third, and fourth lenses arranged from a camera side to a screen side in the given order, wherein: said first lens has a shape factor ranging from −10 to 5; said second lens is a positive lens and has a shape factor ranging from −15 to 2; said third lens is a positive lens and has a shape factor ranging from −30 to 1; and said fourth lens is a positive lens and has a shape factor ranging from −30 to 1; wherein a ratio of a focal length of said optical device to that of the test camera ranges from 1 to 80.

2. The optical device as claimed in claim 1, wherein said first lens is a negative lens and the shape factor of said first lens ranges from 1 to 5.

3. The optical device as claimed in claim 2, wherein the shape factor of said second lens ranges from −15 to −1.

4. The optical device as claimed in claim 3, wherein the shape factor of said third lens ranges from −1 to 1.

5. The optical device as claimed in claim 4, wherein the shape factor of said fourth lens ranges from −1 to 1.

6. The optical device as claimed in claim 5, wherein said optical device has an in which f-number that ranges between 4 and 50.

7. The optical device as claimed in claim 5, wherein said optical device has a field-of-view smaller than 80 degrees.

8. The optical device as claimed in claim 5, wherein said first, second, third and fourth lenses are arranged to form a near telecentric system.

9. The optical device as claimed in claim 5, wherein at least one of said first and second lenses is aplanatic.

10. The optical device as claimed in claim 5, wherein at least one of said first, second, third, and fourth lenses is an achromatic lens.

11. The optical device as claimed in claim 1, wherein each of said first, second, third, and fourth lenses has a first lens surface facing toward the screen side and a second lens surface facing toward the camera side, the shape factor of each of said first, second, third, and fourth lenses being defined by curvatures of said first and second lens surfaces thereof.

* * * * *